Dec. 30, 1958

B. A. KARRY 2,866,290

SNAG FISH HOOK EXTRICATOR

Filed April 19, 1957

INVENTOR.

Bert A Karry

BY Victor J. Evans & Co.

ATTORNEYS

United States Patent Office

2,866,290
Patented Dec. 30, 1958

2,866,290

SNAG FISH HOOK EXTRICATOR

Bert Adolph Karry, Livonia, Mich.

Application April 19, 1957, Serial No. 654,017

3 Claims. (Cl. 43—17.2)

This invention relates to fishing tackle, and in particular a weight slidably mounted by loops on a fishing line and actuated by an auxiliary line whereby the weight is positioned to be used to extricate a fish hook from a root, branch of a log, or body of the log so that the entire fishing line, with the tackle thereon may be retrieved.

The purpose of this invention is to provide means for extricating fish hooks from snags so that the fish hook and substantially the entire fishing line may be recovered.

In numerous instances valuable fishing equipment is lost because the hook of the line is caught in a snag, such as a branch of a log or in the log or other device and with the snag in comparatively deep water one possibility of retrieving the line is to break the line leaving the equipment in the water. With this thought in mind this invention contemplates an elongated body providing a weight with open loops on each end and an auxiliary cord extended from the upper end of the body whereby the body is adapted to be jerked up and down until the weight is properly seated so that when the line is pulled up the hook will be released from a log, or the like.

The object of this invention is, therefore, to provide a fish hook extricating device that is adapted to be used as a hammer for forcing a fish hook from a snag.

Another object of the invention is to provide a fish hook extricating device that may readily be installed on a fishing line when use thereof is desired.

With these and other objects and advantages in view the invention embodies an elongated body of lead or other metal with open loops snapped into recesses in the ends of the body and with an auxiliary line connected to an eye extended from the upper end of the body.

Other features and advantages of the invention will appear from the following description taken in connection with the drawing, wherein.

Figure 1:
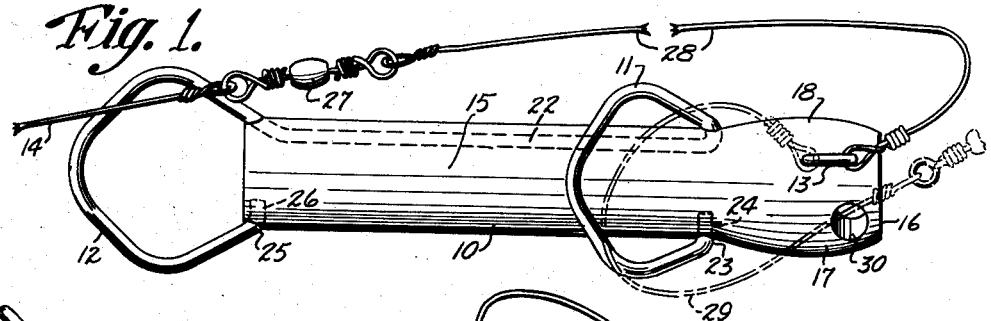
Figure 1 is a plan view of the improved fishing line hook extricator.

Referring now to the drawing wherein like reference characters denote corresponding parts the improved fishing line hook extricator of this invention includes a body 10 of lead or other relatively heavy material, a loop 11 extended inwardly of one end of the body, a loop 12 extended from the opposite end of the body and an eye 13 for attaching an auxiliary fishing line 14 to the end of the body opposite to the end of the body from which the loop 12 extends.

Figure 4:
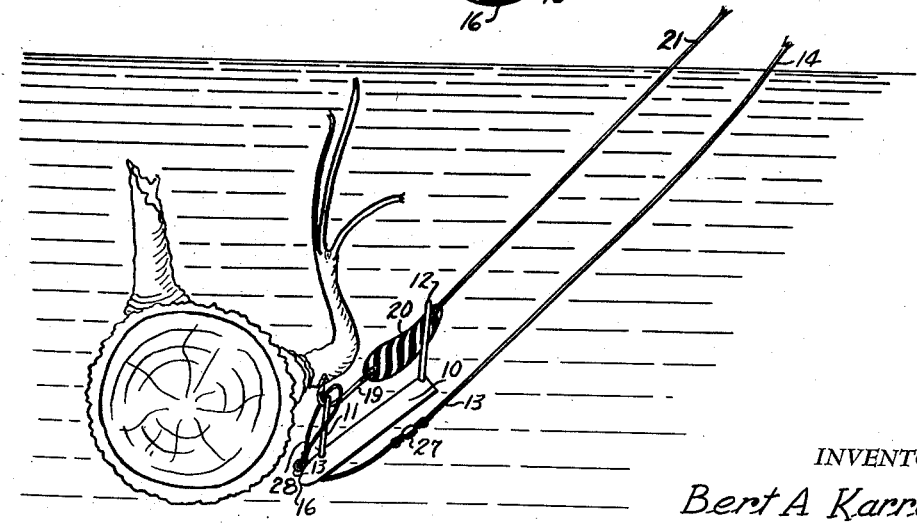
Figure 4 is a view illustrating the use of the fish hook extricator with the parts shown on a reduced scale.

As shown in the drawing the body 10 is formed with a cylindrical body 15 and a tapering lower end 16 and the end 16 is provided with bulging surfaces 17 and 18 whereby the lower end of the body glides over roots, logs, and other obstructions in the water as the device is actuated to release a fish hook, such as the hook 19 extended from a lure 20 with a fishing line 21 in Fig. 4.

The loops 11 and 12 extend from ends of a resilient bar 22 embedded in one side of the metal body 10 and, as shown in Fig. 1 an end 23 of the loop 11 is positioned to snap into a recess 24 in one side of the body 10 and a similar end 25 of the loop 12 is positioned to extend into a recess 26 also located in one side of the body 10.

With the loops 11 and 12 formed with ends adapted to be moved outwardly to open the loops, the loops may readily be snapped upon a fishing line with the ends 23 and 25 positioned to snap back into the recesses 24 and 26, as shown. By this means the extricator may be applied to a fishing line after a hook of the line is caught on a snag and by the same means the device may be removed after the hook and fishing line are retrieved.

Figure 2:
Figure 2 is a side elevational view of the device.
Figure 3:
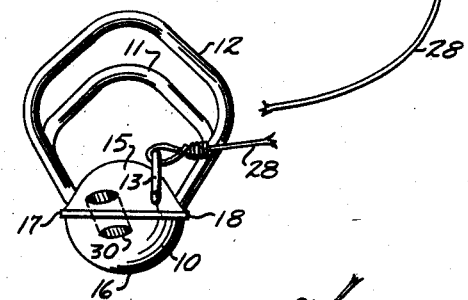
Figure 3 is an end elevational view of the fish hook extricator looking toward the end from which an auxiliary line attaching eye extends.

The auxiliary line 14, which is provided with a swivel 27 is connected by a short piece of line 28 to the eye 13, and, as illustrated by the broken lines 29, in Fig. 1, and the full lines in Fig. 2, the short piece of line 28 is looped from the eye 13 through an opening 30 in the nose or tapering lower end 16 of the body 10.

The loop formed by the broken line 29 may be placed on the body in the position shown in Fig. 1 in order to be engaged with the lure or a hook extended from the lure, such as the hook 19, shown in Fig. 4, whereby by pulling on the line 14 a hook may be withdrawn from a log or the like.

It will be understood that modifications, within the scope of the appended claims, may be made in the design and arrangement of the parts without departing from the spirit of the invention.

What is claimed is:

1. In a fish hook extricator, the combination which comprises an elongated metal body having arcuate recesses in the sides thereof and having a nose with bulging edges at one end, a resilient bar embedded in said elongated body, loops extending from opposite ends of the resilient bar in planes disposed at acute angles to the longitudinal axis of the resilient bar, and an eye extending from the portion of said elongated body adjacent said nose, the ends of the loops opposite to the ends contiguous with the resilient bar being urged into the recesses in the sides of the elongated body by the resiliency inherent in said loops.

2. In a fish hook extricator, the combination which comprises an elongated metal body having a transverse opening extending therethrough, arcuate recesses in the sides thereof and having a nose with bulging edges at one end, a resilient bar embedded in said elongated body, loops extending from the opposite ends of the resilient bar in planes disposed at acute angles to the longitudinal axis of the bar and an eye extending from the portion of said elongated body adjacent said nose, the ends of the loops opposite to the ends contiguous with the resilient bar being urged into the recesses in the sides of the elongated body by the resiliency inherent in said loops, and one of said loops being positioned in a plane extending outwardly from the end of the elongated body and the other in a plane extending over the elongated body.

3. In a fish hook extricator as in claim 2, wherein an auxiliary line having a swivel therein is connected to said eye and threaded through the opening therein providing a loop and said loop being extended for positioning over a lure or hook extended therefrom.

References Cited in the file of this patent

UNITED STATES PATENTS

| 2,074,057 | Kempe | Mar. 16, 1937 |
|---|---|---|
| 2,353,357 | Paulick | July 11, 1944 |
| 2,562,413 | Carr | July 31, 1951 |
| 2,764,833 | Clark | Oct. 2, 1956 |
| 2,765,567 | Fifer | Oct. 9, 1956 |
| 2,798,332 | Garrison | July 9, 1957 |